United States Patent

Gammel et al.

(10) Patent No.: US 10,514,892 B2
(45) Date of Patent: Dec. 24, 2019

(54) APPARATUS AND METHOD FOR DETECTING INTEGRITY VIOLATION

(71) Applicant: Infineon Technologies AG, Neubiberg (DE)

(72) Inventors: Berndt Gammel, Markt-Schwaben (DE); Stefan Mangard, Munich (DE); Steffen Sonnekalb, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1480 days.

(21) Appl. No.: 13/951,635

(22) Filed: Jul. 26, 2013

(65) Prior Publication Data

US 2015/0032787 A1 Jan. 29, 2015

(51) Int. Cl.
*G06F 7/58* (2006.01)
*G06F 21/71* (2013.01)
*G06F 21/86* (2013.01)

(52) U.S. Cl.
CPC .............. *G06F 7/582* (2013.01); *G06F 21/71* (2013.01); *G06F 21/86* (2013.01); *G06F 7/584* (2013.01); *G06F 2207/583* (2013.01)

(58) Field of Classification Search
CPC .................................................... G06F 7/584
USPC ......... 708/250–256, 498, 525, 552; 714/728, 714/738, 739
See application file for complete search history.

(56) References Cited

U.S. PATENT DOCUMENTS

| 4,355,366 A | * | 10/1982 | Porter | ........................... 708/255 |
| 2003/0206630 A1 | * | 11/2003 | Rarick | .................... G06F 7/584 380/46 |
| 2009/0110137 A1 | * | 4/2009 | Goettfert et al. | ............... 377/72 |

FOREIGN PATENT DOCUMENTS

DE 102004037814 B4 12/2010

OTHER PUBLICATIONS

Wikipedia, Linear Feedback Shift Register, Feb. 7, 2012, pp. 1-9.*
(Continued)

*Primary Examiner* — Andrew Caldwell
*Assistant Examiner* — Emily E Larocque
(74) *Attorney, Agent, or Firm* — Murphy, Bilak & Homiller, PLLC (57) ABSTRACT

An apparatus for detecting integrity violation includes a feedback shift register including a plurality of registers connected in series, and a feedback function unit connected between an output of a number of the registers and an input of at least one of the registers. The apparatus further includes an integrity violation detector adapted to determine as to whether a sequence of values at an input or output of at least one of the registers, or a logic combination thereof, is a non-constant sequence or a constant sequence. The apparatus is further adapted to output an indication that the feedback shift register is in an integral state if the sequence of values is a non-constant sequence, or to output an indication that the feedback shift register is subjected to an integrity violation if the sequence of values is a constant sequence.

23 Claims, 2 Drawing Sheets

(56) References Cited

OTHER PUBLICATIONS

"Linear rückgekoppeltes Schieberegister", Wikipedia, accessed online at https://de.wikipedia.org/w/index.php?title=Linear_r%C3%BCckgekoppeltes_Schieberegister&oldid=117011504 on Jan. 23, 2019. English abstract submitted herewith.
Chan, Agnes Hui, et al., "On the Linear Complexity of Feedback Registers", IEEE Transactions on Information Theory, vol. 36, No. 3, May 1990, pp. 640-644.

* cited by examiner

APPARATUS AND METHOD FOR DETECTING INTEGRITY VIOLATION

TECHNICAL FIELD

Embodiments of the invention refer to an apparatus, to an integrity violation detector, to a method for detecting an integrity violation, to a non-transitory storage medium and to an embedded system.

BACKGROUND

Feedback shift registers are configured to have a linear recurrence equation (LFSR) or nonlinear recurrence equation (NLFSR). Further, feedback shift registers can be configured in the Fibonacci configuration, F(N)LFSR. A further configuration is in the Galois configuration, G(N) LFSR.

In operation of the feedback shift register, a number of register values are fed into a feedback function unit running a feedback function f(D), which is either a linear or nonlinear function of the input register values. Hence, the value of the feedback function f(D) calculated for a current state D yields a feedback value.

In the Fibonacci configuration this feedback value is inserted in the last register $D_{n-1}$ in a next clock cycle. In the Galois configuration this feedback value is fed back to additional registers within the chain of registers by means of an Exclusive-Or (XOR) operation, which is an addition in the field F2. In a more general configuration a feedback shift register can have multiple feedback functions whose different feedback values are fed back to different registers in the register chain.

For feedback shift registers in the Galois configuration the feedback function f(D) vanishes. In other words, the value of the register $D_0$ is fed back directly, since the linear recurrence is already fully defined by the selection of the set of feedback position.

SUMMARY

An embodiment provides an apparatus comprising a feedback shift register and an integrity violation detector. The feedback shift register comprises a plurality of registers connected in series, and a feedback function unit connected between an output of a number of the registers and an input of at least one of the registers. The integrity violation detector is adapted to determine as to whether a sequence of values at an input or output of at least one of the registers, or a logic combination thereof, is a non-constant sequence or a constant sequence. The integrity violation detector is further adapted to output an indication that the feedback shift register is in an integral state if the sequence of values is a non-constant sequence, or to output an indication that the feedback shift register is subjected to an integrity violation if the sequence of values is a constant sequence.

A further embodiment provides an apparatus comprising a feedback shift register in a Fibonacci-configuration, in a Galois-configuration, or in the general configuration. The feedback shift register comprises a plurality of registers connected in series, and a feedback function unit connected between an output of a number of the registers and an input of at least one of the registers. The apparatus further comprises an integrity violation detector. The integrity violation detector is adapted to determine as to whether a sequence of values at an input or output of at least one of the registers, or a logic combination thereof, is a non-constant sequence or a constant sequence. Further, the integrity violation detector is adapted to output an indication that the feedback shift register is in an integral state if the sequence of values is a non-constant sequence; or to output an indication that the feedback shift register is subjected to an integrity violation if the sequence of values is a constant sequence. Further, the integrity violation detector comprises an online tester adapted to count a length of runs of 0-Bits and 1-Bits in an inbound sequence of values, and to output the indication that the feedback shift register is subjected to the integrity violation if the length of a run exceeds a predetermined value. The feedback function unit is connected to the input of one of the plurality of registers via an XOR-gate, which is connected between the register and a preceding register, and an online tester is connected to the output of the preceding register. Additionally or as an alternative, a seed injection input is connected to the input of one of the plurality of registers via an XOR-gate, which is connected between the register and a preceding register, a logic circuit is connected in parallel between the output of the register and the output of the preceding register, and an online tester is connected to the output of the logic circuit. Additionally or as an alternative, the logic circuit comprises a series connection of a register and an XOR-gate, wherein the output of the XOR-gate is connected to the online tester. Additionally or as an alternative, the output of the preceding register is connected to the online tester in-line. Additionally or as an alternative, the online tester is connected to the input of a first register of the feedback shift register in-line.

A further embodiment provides an integrity violation detector adapted to detect an integrity violation exerted on an associated feedback shift register configured by a plurality of registers. The integrity violation detector is adapted to determine as to whether a sequence of values at an input or output of at least one of the registers, or a logic combination thereof, is a non-constant sequence or a constant sequence. Further, the integrity violation detector is adapted to output an indication that the feedback shift register is in an integral state if the sequence of values is a non-constant sequence, or to output an indication that the feedback shift register is subjected to an integrity violation if the sequence of values is a constant sequence.

A further embodiment provides a method for detecting an integrity violation exerted on a feedback shift register, wherein the feedback shift register comprises a plurality of registers connected in series, and a feedback function unit connected between an output of a number of the registers and an input of at least one of the registers. The method comprises determining as to whether a sequence of values at an input or output of at least one of the plurality of registers comprised by the feedback shift register, or a logic combination thereof, is a non-constant sequence or a constant sequence. The method further comprises putting out an indication that the feedback shift register is in an integral state if the sequence of values is a non-constant sequence, or putting out an indication that the feedback shift register is subjected to an integrity violation if the sequence of values is a constant sequence.

A further embodiment provides a non-transitory storage medium having stored thereon a computer program having a program code for performing, when running on a computer, a method for detecting an integrity violation exerted on a feedback shift register, the method comprising determining as to whether a sequence of values at an input or output of at least one of a plurality of registers comprised by the feedback shift register, or a logic combination thereof, is a non-constant sequence or a constant sequence. Further, the method comprises putting out an indication that the feedback shift register is in an integral state if the sequence of values is a non-constant sequence, or putting out an indication that the feedback shift register is subjected to an integrity violation if the sequence of values is a constant sequence.

A further embodiment provides an embedded system comprising a memory and a controller, wherein the controller is adapted to detect an integrity violation exerted on an feedback shift register implemented in software by a method comprising determining as to whether a sequence of values at an input or output of at least one of the plurality of registers comprised by the feedback shift register, or a logic combination thereof, is a non-constant sequence or a constant sequence. The method further comprises putting out an indication that the feedback shift register is in an integral state if the sequence of values is a non-constant sequence, or putting out an indication that the feedback shift register is subjected to an integrity violation if the sequence of values is a constant sequence.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Different embodiments of the teachings disclosed herein will subsequently be discussed referring to FIG. 1 and FIG. 2. In the drawings, identical reference numerals are provided to objects having identical or similar functions so that objects referred to by identical reference numerals within the different embodiments are interchangeable and the description is mutually applicable.

Figure 1:
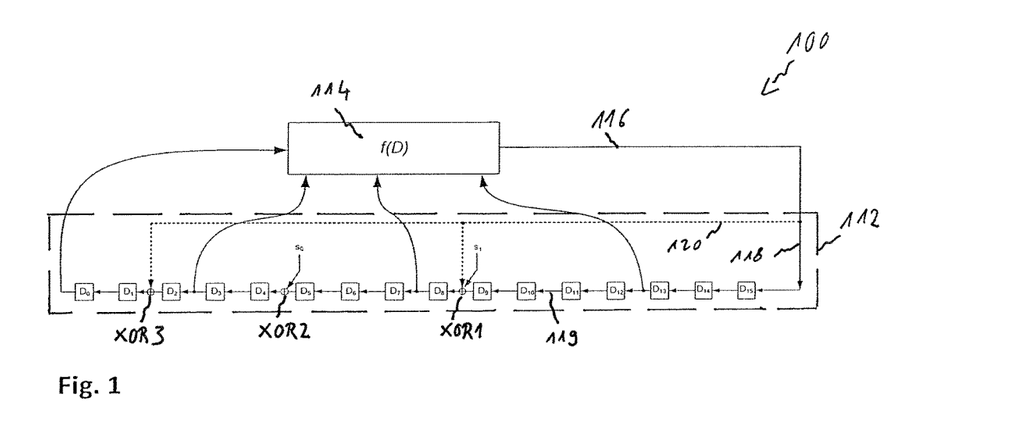
FIG. 1 shows a configuration of a feedback shift register.

Referring to FIG. 1, a feedback shift register 100 is depicted, comprising a shift chain 112 of n registers $D_k$ (k=0 to n−1) connected in series. The registers can be realized by delay elements such as flip-flops. At any point in time t, the registers presume the state $D_t=(D_{0,t}, D_{1,t}, \ldots, D_{n-1,t})$ of the feedback shift register 100. In the drawings, n=16 registers are depicted, but the length may be varied.

The feedback shift register 100 comprises an output for putting out pseudorandom sequences, wherein the output is formed by the output of at least one of the registers and/or the input of any of the same. Such pseudorandom sequences may be used as masks in secret sharing schemes, for example, which are used to protect cryptographic algorithms against side-channel attacks. Pseudorandom sequences are used as components in cryptographic pseudorandom number generators, for example.

Further, the feedback shift register 100 comprises a feedback function unit 114 for calculating a feedback function f(D). A plurality of values output from a subset of the number of registers are fed into the feedback function unit 114, respectively. In the drawings, the outputs of registers $D_0$, $D_3$, $D_8$ and $D_{13}$ are supplied to the feedback function unit 114. The feedback function f(D) calculated by the feedback function unit 114 is either a linear or nonlinear function. The value f(D) calculated for the current state D represents the feedback value, which is output from the feedback function unit 114 and supplied to output line 116 for feedback into the registers. Feedback values may be fed into the input of the first—in shift order—register, here $D_{15}$, and, optionally, into the input of one or more of the other registers.

In FIG. 1, two feedback shift register configurations are depicted, in particular a Fibonacci configuration and a Galois configuration.

In the Fibonacci configuration, depicted by a solid line 118, the value f(D) calculated for the current state D is fed into the last register $D_{15}$ within the shift chain 112 of registers in the subsequent clock cycle, i.e. into the first when seen along a shift direction 119.

In the Galois configuration, depicted by a dotted line 120, the value f(D) calculated for the current state D is fed back to a plurality of registers within the shift chain 112 via a first input of an associated XOR-gate, respectively, which is, via its second input and its output, connected into the sequence of registers. In the drawing, the value f(D) is exemplarily fed back to the inputs of registers $D_1$ and $D_8$ via XOR-gates XOR3 and XOR1, respectively.

In the configuration described above, the feedback shift register 100 is operated in an autonomous mode of operation, i.e., once an initial state has been inputted, this state is stepped forward without further input. That is, per clock cycle, each register $D_i$ outputs its value stored therein at its output to the next register $D_{i-1}$ in shift direction 119 with the last register $D_0$ in line outputting its stored value to an input of the feedback function circuit 114 along with, optionally, one or more further ones of the registers D, such as here for example $D_3$, $D_8$ and $D_{13}$, and with the feedback function circuit 114 outputting its feedback function result into the input of the first register in line, i.e. $D_{15}$, and optionally the input of further registers such as here, for example, $D_8$ and $D_1$. By this measure, the feedback shift register 100 generates at each of the inputs and outputs of the registers a pseudorandom number sequence with a certain period length which can be huge compared to the number of registers, i.e. compared to the length of the feedback shift register 100. For example, while in the present case the length of the feedback shift register 100 is 16, the feedback function f(D) may be designed such that the period length of the pseudorandom number sequence generated is, while continuously remaining in the autonomous mode, $2^n-1$.

In a further configuration, the feedback shift register 100 is operated in a non-autonomous mode of operation. In this mode of operation, m external values $s_t=(s_{0,t}, s_{1,t} \ldots s_{m-1,t})$, called the seed values, are inserted into a state at a particular point in time, simultaneously. In particular, the seed values are supplied to the input of m of the registers via a first input of an XOR-gate, respectively, which is, via its second input and its output, connected into the sequence of registers. In FIG. 1, seed inputs at which values $s_0$ and $s_1$ are applied, are exemplarily shown to be connected to the inputs of registers $D_4$ and $D_8$ via XOR-gates XOR2 and XOR1, respectively. The seed positions can be identical to feedback positions. This possibility is exemplified at seed position $s_1$ at the input of register $D_8$. The XOR gate XOR1 is shown to have four inputs. It may be implemented as a sequence of XOR gates serially connected between registers $D_9$ and $D_8$ via their second inputs and their outputs, with their inputs being connected to the seed input for seed value $s_1$ on the one hand, and the feedback value of the feedback function f(D) on the other hand.

The predetermined feedback function f(D) results in pseudorandom sequences at the output of the number of registers of the feedback shift register 100. These pseudorandom sequences exhibit desired properties which can be used in security applications. Normally, the sequences are balanced, i.e. on average the numbers of 0-Bits and 1-Bits are equal. The sequence of bit values appears to be uncorrelated.

In security applications, such pseudorandom sequences are used to protect against integrity violation. The pseudorandom sequences are used as masks in secret sharing schemes, for example, which are used to protect cryptographic algorithms. One example is the application in Data Encryption Standard (DES), which is a predominant algorithm for the encryption of electronic data. Further, the pseudorandom sequences can be used as masks adapted to protect cryptographic algorithms like the Advanced Encryption Standard (AES), which is a specification for the encryption of electronic data by using a symmetric-key algorithm, which means that the same key is used for both encrypting and decrypting the data.

The pseudorandom sequences generated by the feedback shift register 100 are able to protect against side-channel attacks. One of these side-channel attacks is the Differential Power Analysis (DPA), which involves statistically analyzing power consumption measurements from a cryptosystem.

Further, the pseudorandom sequences generated by the feedback shift register 100 can serve as a mask protecting against the Differential Fault Analysis (DFA), which is a type of side channel attack in the field of cryptography, specifically cryptanalysis. The principle of the DFA is to induce faults, i.e. unexpected environmental conditions, into cryptographic implementations, to reveal their internal states.

A further application of the pseudorandom sequences generated by the feedback shift register 100 can be in the protection against a non-invasive analysis like the Differential Electro-Magnetic Analysis (DEMA). In the DEMA, information is gathered from fluctuations of the electromagnetic field emerging from a device whilst performing a cryptographic operation.

In general, the pseudorandom sequences are used as components in cryptographic pseudorandom number generators, for example. Hence, the security of the overall system depends crucially on the integrity of the feedback shift register 100. For example, if an attacker is able to cut any wire in a feedback shift register 100 or to force one of the registers permanently to a certain value or to suppress the injection of seed values, the desired property of the output of the feedback shift register 100 can no longer be guaranteed. Consequently, cryptographic attacks or side-channel attacks on the algorithm consuming the pseudorandom sequences become feasible. It is desirable to achieve an online test functionality which is able to monitor if the feedback shift register 100 has been tampered with or not.

As noted above, the feedback shift register 100 can be used for security critical tasks. Hence, a failure of the functionality caused by an active attacker could lead to a non-desirable extraction of secrets. For example, if the feedback shift register 100 is used for the generation of masks in a masking scheme against side-channel attacks, forcing the mask generator to stop enables the application of the Differential Power Analysis (DPA) to extract the secret.

In the following, among other attacks, a plurality of possible attack paths are indicated which could lead to a non-desirable failure of the feedback shift register 100.

One possible attack is the forcing of one of the seed injection inputs $s_0$ and/or $s_1$. In doing so, the output sequence would become deterministic or at least partially deterministic, resulting in integrity violation.

A further attack is the forcing of one of the shift value wires connecting the plurality of registers in series. In doing so, the feedback shift register or a segment of the feedback shift register would be filled with a constant value, resulting in integrity violation.

In the Galois configuration, a further attack is the forcing of one of the feedback wires connecting the output of the feedback function unit 114 to the input of at least one of the registers via the XOR-gates. In doing so, the feedback shift register or a segment of the feedback shift register would be filled with a constant value, resulting in integrity violation.

In this context, the terms forcing and cutting as used herein are used synonymously. These terms have the meaning of forcing to some constant value.

Figure 2:
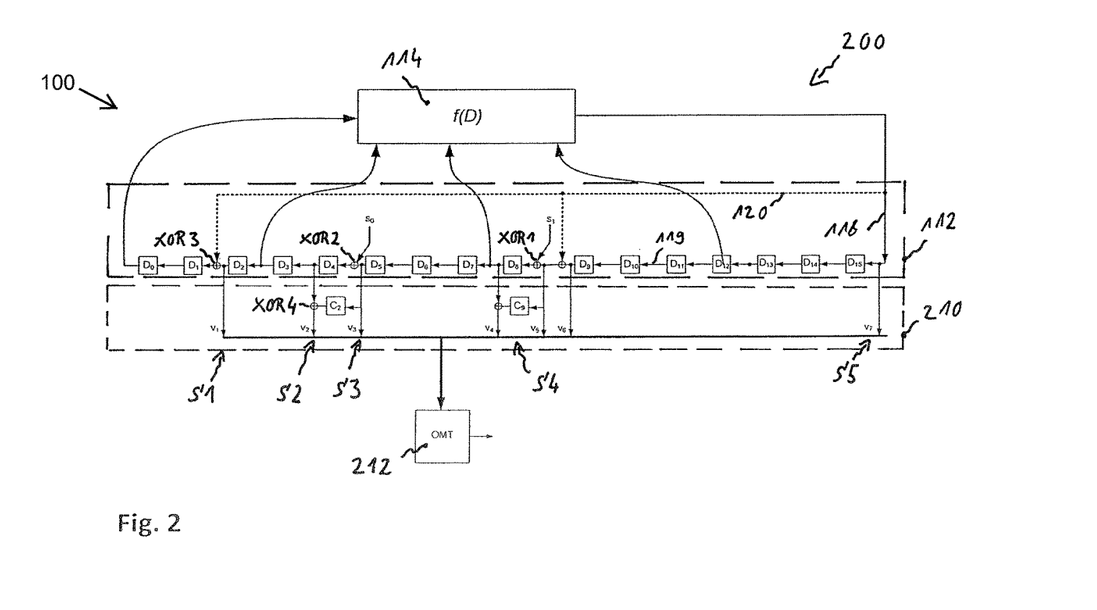
FIG. 2 shows a configuration of an apparatus comprising the feedback shift register.

FIG. 2 shows a configuration of an apparatus 200 comprising a feedback shift register 100 with the apparatus being able to detect failure attacks as just-outlined.

The apparatus 200 comprises an integrity violation detector 210 in addition to the feedback shift register 100 as depicted in FIG. 1 and described above. The integrity violation detector 210 comprises logic circuit used for the detection of at least one integrity violation. In other words, the integrity violation detector 210 provides countermeasures against attacks to the feedback shift register 100.

In general, the integrity violation detector 210 is adapted to determine as to whether a sequence of values provided at an input or output of at least one of the registers, or a logic combination thereof, is a non-constant sequence or a constant sequence. Subsequent to the determination, the integrity violation detector 210 is adapted to output an indication that the feedback shift register 100 is in an integral state if the sequence of values is a non-constant sequence. Further, the integrity violation detector 210 is adapted to put out an indication that the feedback shift register 100 is subjected to an integrity violation if the sequence of values is a constant sequence. In the following, the integrity violation detector 210 is described in more detail.

As shown in FIG. 2, in accordance with a first structure S1, the integrity violation detector 210 is adapted to detect an integrity violation of the shift chain 112. The feedback function unit 114 is exemplarily connected to the input of the register $D_1$ via the XOR-gate XOR3, which is in turn connected between this register $D_1$ and preceding register $D_2$. An online tester 212 of the integrity violation detector 210 is, in accordance with the first structure S1, connected to the output of the preceding register $D_2$ via a test output tap v1. In case of the feedback shift register 100 being attacked by cutting the shift chain 112 upstream of register $D_2$, for example, constant values arrive at the online tester 212. In case of detecting constant values at its input connected to tap v1, the online tester 212 is adapted to output e.g. an alert indicating an integrity violation.

As shown in FIG. 2, in accordance with a second structure S2, the integrity violation detector 210 comprises a circuit which is adapted to detect an integrity violation of a seed injection value $s_0$ into the shift chain 112 of registers. In this structure S2, a seed injection input is connected to the input of register $D_4$ of the plurality of registers via an XOR-gate XOR2. This XOR-gate XOR2 is in turn connected between the register $D_4$ and preceding register $D_5$. Further, a logic circuit is connected in parallel between the output of the register $D_4$ and the output of the preceding register $D_5$. The logic circuit comprises a series connection comprising a register C2 and an XOR-gate XOR4. The output of the XOR-gate XOR4 is connected to a test output tap v2 which is connected to the online tester 212.

In this structure, if the seed injection value $s_0$ is forced to a constant value, the value of the test output tap v2 becomes a constant value. Further, if the state of the feedback shift register 100 runs through a pseudorandom sequence, the value of the test output tap v2 becomes a constant value, too.

Further, in accordance with a third structure S3, the output of the preceding register $D_5$ is connected to a test output tap v3 in-line, which is connected to the online tester 212. The value of test output tap v3 is constant if the shift chain 112 is cut upstream of register $D_9$. Hence, in case of the feedback shift register 100 is attacked by cutting the shift chain 112 upstream of register $D_9$, for example, the output of the test output tap v3 presumes to constant values, which are detected in the online tester 212. In this case of detecting constant values, the online tester 212 is adapted to output an indication or notification, which indicate integrity violation.

In FIG. 2, in accordance with a forth structure S4, in-between registers $D_8$ and $D_9$, a state is shown, comprising the injection of a seed value s1 and the input of a feedback value. Conventionally, for both the injection of a seed value s1 and the input of a feedback value, a single 3-input XOR-gate is used. In the structure shown in FIG. 2, the 3-input XOR-gate is replaced by two 2-input XOR-gates. Additionally, the logic circuits mentioned above are applied separately.

In FIG. 2, in accordance with a fifth structure S5, a first register $D_{15}$ of the shift chain 112 of registers is connected to a test output tap v7, which in turn is connected to the online tester 212. In case of a feedback line of the feedback shift register 100 is cut due to integrity violation, the output of the test output tap v7 yields constant values, which are in turn detected by the online tester 212. In this case of detecting constant values, the online tester 212 is adapted to put out e.g. an alert indicating integrity violation.

In the foregoing, only by way of example, the integrity violation detector 210 comprises the online tester 212 connected to the test output taps v1 to v7. However, these test output taps v1 to v7 are illustrative. In an alternative, these test output taps v1 to v7 can be present individually or only a subset thereof is present. In other words, only a subset of the above structures S1 to S5 may be realized. In doing so, the online tester 212 can be connected to inputs or outputs of respective registers, or the logic combination thereof, directly.

In general, the online tester 212 is adapted to count —in the clock cycles of the shift register 112—a length of runs of 0-Bits and 1-Bits in an inbound sequence of values, i.e. the sequence arriving at tap v1, arriving at tap v2, . . . or the tap v7. Further, the online tester 212 is adapted to put out the indication that the feedback shift register 100 is subjected to the integrity violation if the length of any of the runs at any of the inbound value sequences exceeds a predetermined value. For example, a possible configuration value is equal to 63. For this value the probability of a false alarm is equal to $2^{-63}$, provided the seeding takes place at every clock cycle. This would result in the probability of having a false alarm being negligible.

In FIG. 2, the feedback shift register 100 comprises a shift chain 112 of registers. This shift chain 112 is composed of 16 registers $D_0$ to $D_{15}$ connected in series. The feedback shift register 100 further comprises a feedback function unit 114.

In the Fibonacci configuration, the output of the feedback function unit 114 is connected to the input of the chain 112 of registers, i.e. to the first register $D_{15}$ in chain. In the Galois configuration, the output of the feedback function unit 114 is connected to the input of at least one of the plurality of registers via an XOR-gate. In the FIG. 2, the output of the feedback function unit 114 is connected to the input of registers $D_1$ and $D_8$ via XOR-gates XOR3 and XOR1, respectively.

In the drawing, in the non-autonomous mode of operation of the feedback shift register 100, the shift chain 112 of registers comprises a plurality of seed injection inputs, which are connected to the input of one of the plurality of registers via an XOR-gate, respectively. In the drawing, the seed injection input $s_0$ is connected between register $D_4$ and preceding register $D_5$ via the XOR-gate XOR2. Further, the seed injection input $s_1$ is connected between register $D_8$ and preceding register $D_9$ via the XOR-gate XOR1.

Via the seed injection inputs $s_0$ and $s_1$, external values, called the seed values, are simultaneously inserted into the shift chain 112 of registers. The seed values are subjected an XOR-operation to thereby shift values between particular pairs of registers or before the last register.

Further, the outputs (register values) of at least one of the registers are input to the feedback function unit 114. In this feedback function unit 114, feedback values are generated by subjecting the register values to a feedback function f(D), which is a linear or non-linear function of the input register values.

The feedback shift register 100 as depicted in FIG. 2, further comprises an integrity violation detector 210, comprising an online tester 212.

Further, in a first option of detecting integrity violation of the shift chain 112, this integrity violation detector 210 comprises an in-line connection, connecting the output of register $D_2$ to the online tester 212 (refer to v1). In order to enhance detection of integrity violation of the shift chain 112, or as an alternative, a second in-line connection as described above is provided (refer to v6).

In a second option, in order to detect integrity violation of seed injection, the seed injection input $s_0$ is connected to the input of register $D_4$ via XOR-gate XOR2, which is in turn connected between the register $D_4$ and the preceding register $D_5$. Further, a logic circuit is connected in parallel between the output of the register $D_4$ and the output of the preceding register $D_5$. Further, the online tester 212 is connected to the output of the logic circuit described above. The logic circuit comprises a series connection of register C2 and XOR-gate XOR4, wherein the output of the XOR-gate XOR4 is connected to the online tester 212 (refer to v2). Further, the output of the preceding register $D_5$ is connected to the online tester 212 in-line (refer to v3). Notice that the rate of input seed values can be set in synchronism to the clock rate of the feedback shift register 100. As an alternative, this rate of input seed values can be set user dependent. In order to enhance detection of integrity violation, or as an alternative, a second logic circuit as described above is provided (refer to v4 and v5).

Further, the online tester 212 is connected to the input of the first register $D_{15}$ of the feedback shift register 100 in-line (refer to v7).

The online tester 212 is adapted to perform detection of integrity violation by monitoring the respective input values. In case of detecting non-constant values input into the online tester 212, i.e. a random number (string) of 0-Bits and 1-Bits, a signal, a notification or any other kind of indication is put out from the online tester 212, which indicates that the feedback shift register 100 is in a state free of integrity violation.

Otherwise, if a number of bits input into the online tester 212 shows constant values, the online tester 212 indicates that the feedback shift register 100 is in a state of integrity violation. Notice that a length of a respective sequence of bits showing constant values, i.e. a length of a sequence of consecutive 0-Bits or consecutive 1-Bits, at which length the online tester 212 has to indicate integrity violation, is a predetermined value or a value set by the user, for example. In other words, if the online tester 212 detects a constant sequence of a predetermined or set length, the online tester 212 outputs an indication for a fault attack. A possible configuration value of the length of bits is 63, for example. For this length of bits, the probability of a false alarm is $2^{-63}$. This case exemplifies that the probability of a false alarm can be neglected, even if the clock rate is high.

In case of the online tester 212 detects an integrity violation, the process of further treatment can be various and user dependent, i.e. dependent on the respective application, the desired level of security, etc. One possible treatment is the signaling of the detected integrity violation by way of an alarm. Another kind of treatment is the interrupting of the operation of the feedback shift register 100 and the embedding system for a given length of time or set length of time. In case of a massive attack, even the interruption of the operation of the feedback shift register 100 and the embedding system for a few seconds or less, for example, can be sufficient to render integrity violation of the feedback shift register 100 and/or an associated cryptographic device, comprised by a smartcard controller, an RFID-tag, an embedded security controller, etc., almost impossible or at least time-consuming.

An advantage of the above embodiment, in any of, or in any combination of, the above outlined structures S1 to S5 of the integrity violation detector 210, is a significant reduced area and reduced power consumption, compared with instantiating a feedback shift register multiple times and comparing the results, which is crucial for small embedded systems, like for example smartcard controllers, RFID tags or embedded security controllers.

The apparatus described above can be implemented by a method for detecting an integrity violation exerted on a feedback shift register 100, wherein the feedback shift register 100 comprises the plurality of registers connected in series in the shift chain 112 of registers. The feedback shift register 100 further comprises the feedback function unit 114 connected between an output of a number of the registers and an input of at least one of the registers.

The method comprises determining as to whether a sequence of values at an input or output of at least one of the plurality of registers comprised by the feedback shift register, or a logic combination thereof, is a non-constant sequence or a constant sequence. As mentioned above, in case of the sequence of values is a constant value, this is an indication of an integrity violation of the shift chain 112 or of an integrity violation of the seed injection.

The method further comprises putting out an indication that the feedback shift register is in an integral state if the sequence of values is a non-constant sequence, or putting out an indication that the feedback shift register is subjected to an integrity violation if the sequence of values is a constant sequence. This method provides proper indication of a fault attack to the feedback shift register 100.

In other words, the method comprises receiving a sequence of values at an input or output of at least one of the plurality of registers comprised by the feedback shift register 100, or a logic combination thereof. The method further comprises counting the length of runs of 0-Bits and 1-Bits, and indicating the detection of integrity violation if the length of a run exceeds a predetermined value or a set value.

The apparatus and method described above can be implemented in an embedded system, for example a security controller used in smartcards, RFID tags, mobile phones, automobiles, gaming consoles, etc. A possible implementation is in several pseudo random number generators for internal masking.

Further, multiple implementation of the feedback shift register 100 and online comparison of output or shifted values are possible.

Figure 3:
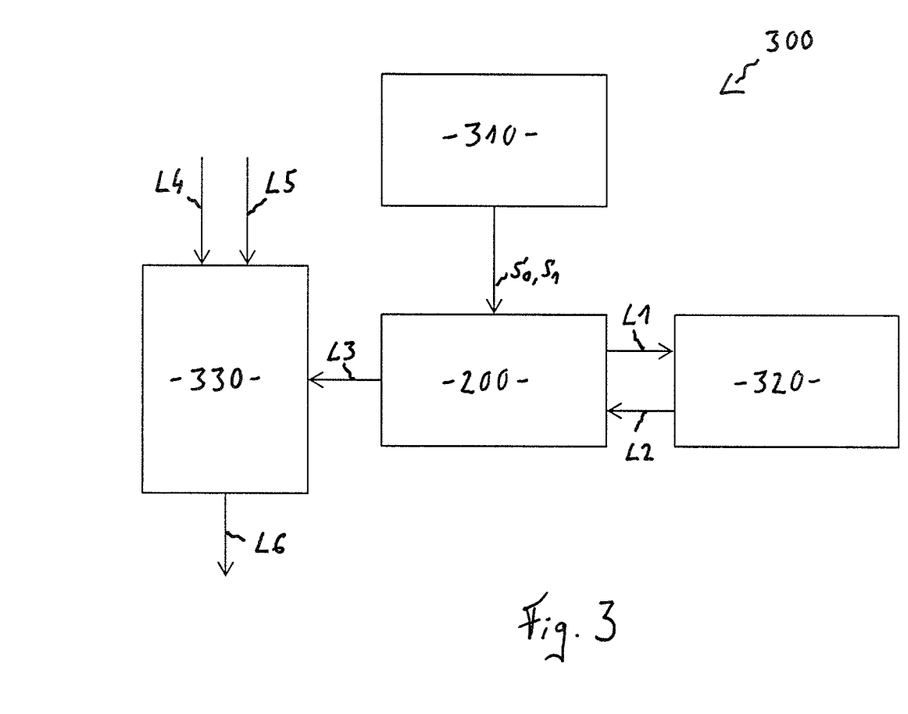
FIG. 3 shows an embedded system comprising the apparatus shown in FIG. 2.

FIG. 3 shows a schematic configuration of an embedded system 300 comprising the apparatus 200 depicted in FIG. 2. The embedded system 300 can be part of a smartcard controller, an RFID-tag, an embedded security controller, etc. Further, the embedded system 300 comprises a True Random Number Generator TRNG 310 for generating random numbers to be used for seed values $s_0$ and $s_1$. The generated random numbers are input into seed injection inputs of the shift chain comprised by the feedback shift register in the apparatus 200 described above.

As mentioned above, e.g. in accordance with the seed values $s_0$ and $s_1$, the apparatus 200 is adapted to detect integrity violation and to put out an indication that the apparatus is in an integral state or is subjected to integrity violation. In other words, the apparatus 200 is able to detect a variety of manipulations conducted to values input into the apparatus 200 (e.g. seed values $s_0$ and $s_1$) and/or to values generated in the apparatus 200 itself.

The output of the online tester described above is connected to the input of a countermeasure unit 320 via line L1. The countermeasure unit 320 is configured to respond to an input indicating integrity violation via line L1. One way of responding to integrity violation is the signaling of the detected integrity violation by way of an alarm. Another way of responding to integrity violation is the interrupting of the operation of the feedback shift register of apparatus 200 and the embedding system for a given length of time or for a set length of time. In this case, a respective signal is sent from the countermeasure unit 320 to the apparatus 200 via a line L2, for example.

In case of the online tester detects an integrity violation, the process of further treatment can be various and user dependent, i.e. dependent on the respective application, the desired level of security, etc. If a massive attack is conducted, even the interruption of the operation of the feedback shift register and the embedding system for a few seconds or less, for example, can be sufficient to render integrity violation of the feedback shift register almost impossible or at least time-consuming.

The embedded system 300 further comprises a randomizer 330 connected to the output of the apparatus 200 via line L3 for receiving shift values generated by the apparatus 200 as described above. For example, the randomizer 330 is adapted to transpose or invert signals or to otherwise encode a message. In doing so, the randomizer 330 can be fed with input sequences input via lines L4 and L5, for example, which input sequences are encoded appropriate. The output of the randomizer 330 supplies the encoded message via line L6 to a random number receiving means (not shown) for further processing.

In case of integrity violation detected by the online tester of apparatus 200, the operation of the randomizer 330 can be stopped for a set or predetermined length of time. In case of a massive attack, even the interruption of the operation of the feedback shift register and the embedding system for a few seconds or less, for example, can be sufficient to render integrity violation of the randomizer 330 almost impossible or at least time-consuming.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. An apparatus, comprising:
    a feedback shift register comprising:
        a plurality of registers connected in series, and
        a feedback function unit connected between an output of a number of the registers and an input of at least one of the registers; and
    an integrity violation detector connected to an input or an output of at least one register of the plurality of registers, said input or output of the at least one register being between the at least one register and either a preceding register or succeeding register of the plurality of registers, wherein the integrity violation detector is adapted to:
        determine whether a sequence of values at the input or output of the at least one register, or a logic combination thereof, is a non-constant sequence or a constant sequence; and
        output an indication that the feedback shift register is in an integral state in response to determining that the sequence of values is a non-constant sequence, or output an indication that the feedback shift register is subjected to an integrity violation in response to determining that the sequence of values is a constant sequence.

2. The apparatus according to claim 1, wherein the integrity violation detector comprises an online tester adapted to:
    count a length of runs of 0-Bits and 1-Bits in an inbound sequence of values; and
    output the indication that the feedback shift register is subjected to the integrity violation in response to determining that the length of runs exceeds a predetermined value.

3. The apparatus according to claim 2, wherein the feedback function unit is connected to the input of the succeeding register via an XOR-gate, which is connected between the at least one register and the succeeding register, and the online tester is connected to the output of the at least one register.

4. The apparatus according to claim 2, wherein a seed injection input is connected to the input of the at least one register via an XOR-gate, which is connected between the at least one register and the preceding register, a logic circuit is connected in parallel between the output of the at least one register and the output of the preceding register, and the online tester is connected to the output of the logic circuit.

5. The apparatus according to claim 4, wherein the logic circuit comprises a series connection of a register and an XOR-gate, wherein the output of the XOR-gate is connected to the online tester.

6. The apparatus according to claim 4, wherein the output of the preceding register is connected to the online tester in-line.

7. The apparatus according to claim 2, wherein the online tester is connected to the input of a first register of the feedback shift register in-line.

8. The apparatus according to claim 1, wherein the registers are configured by flip-flops.

9. The apparatus according to claim 1, wherein the feedback shift register is a linear or a nonlinear feedback shift register.

10. The apparatus according to claim 1, wherein the feedback shift register comprises an output for putting out pseudorandom value sequences, the output being formed by the output of at least one of the registers.

11. The apparatus according to claim 1, wherein the feedback function unit implements either a linear or a nonlinear function.

12. The apparatus according to claim 1, wherein the feedback shift register is in a Fibonacci-configuration or in a Galois-configuration.

13. The apparatus according to claim 1, wherein the integrity violation detector comprises a logic circuit connected in parallel to the at least one register of the registers of the plurality of registers, wherein an input of the logic circuit is connected between the at least one register and the preceding register and wherein a result of the integrity violation detector is an XOR connection of an output value provided directly by the at least one register and an output of the logic circuit to detect an integrity violation between the connection of the input of the logic circuit and the input of the at least one register.

14. An apparatus, comprising:
    a feedback shift register in a Fibonacci-configuration or in a Galois-configuration, the feedback shift register comprising:
        a plurality of registers connected in series, and
        a feedback function unit connected between an output of a number of the registers and an input of at least one of the registers; and
    an integrity violation detector connected to an input or an output of at least one register of the plurality of registers, said input or output of the at least one register being between the at least one register and either a preceding register or succeeding register of the plurality of registers, wherein the integrity violation detector is adapted to:
        determine whether a sequence of values at the input or output of the at least one register, or a logic combination thereof, is a non-constant sequence or a constant sequence; and
        output an indication that the feedback shift register is in an integral state in response to determining that the sequence of values is a non-constant sequence, or output an indication that the feedback shift register is subjected to an integrity violation in response to determining that the sequence of values is a constant sequence;

wherein the integrity violation detector comprises an online tester adapted to:
   count a length of runs of 0-Bits and 1-Bits in an inbound sequence of values; and
   output the indication that the feedback shift register is subjected to the integrity violation if the length of runs exceeds a predetermined value;
wherein the feedback function unit is connected to the input of the succeeding register via an XOR-gate, which is connected between the at least one register and the succeeding register, and the online tester is connected to the output of the at least one register; and/or
a seed injection input is connected to the input of the at least one register via an XOR-gate, which is connected between the at least one register and the preceding register, a logic circuit is connected in parallel between the output of the at least one register and the output of the preceding register, and the online tester is connected to the output of the logic circuit; and/or
the output of the preceding register is connected to the online tester in-line; and/or
the online tester is connected to the input of a first register of the feedback shift register in-line.

15. The apparatus according to claim 14, wherein the logic circuit is connected in parallel to one of the registers of the plurality of registers, wherein an input of the logic circuit is connected between the at least one register and the preceding register and wherein a result of the integrity violation detector is an XOR connection of an output value provided directly by the at least one register and an output of the logic circuit to detect an integrity violation between the connection of the input of the logic circuit and the input of the at least one register.

16. An integrity violation detector adapted to detect an integrity violation exerted on an associated feedback shift register configured by a plurality of registers, the integrity violation detector being further adapted to:
   determine as to whether a sequence of values at an input or output of at least one of the registers, or a logic combination thereof, is a non-constant sequence or a constant sequence; and
   output an indication that the feedback shift register is in an integral state in response to determining that the sequence of values is a non-constant sequence, or output an indication that the feedback shift register is subjected to an integrity violation in response to determining that the sequence of values is a constant sequence,
wherein the integrity violation detector is connected to an input or an output of at least one register of the plurality of registers, said input or output of the at least one register being between the at least one register and either a preceding register or succeeding register of the plurality of registers.

17. The integrity violation detector according to claim 16 comprising an online tester adapted to:
   count a length of runs of 0-Bits and 1-Bits in an inbound sequence of values; and
   output the indication that the feedback shift register is subjected to the integrity violation if the length of runs exceeds a predetermined value.

18. The integrity violation detector according to claim 16, wherein the integrity violation detector comprises a logic circuit connected in parallel to one of the registers of the plurality of registers, wherein an input of the logic circuit is connected between the at least one register and the preceding register and wherein a result of the integrity violation detector is an XOR connection of an output value provided directly by the at least one register and an output of the logic circuit to detect an integrity violation between the connection of the input of the logic circuit and the input of the at least one register.

19. A method for detecting an integrity violation exerted on a feedback shift register, the feedback shift register comprising:
   a plurality of registers connected in series, and
   a feedback function unit connected between an output of a number of the registers and an input of at least one of the registers;
   the method comprising:
      determining between a preceding and a succeeding register of the plurality of registers as to whether a sequence of values at an input or output of at least one of the plurality of registers comprised by the feedback shift register, or a logic combination thereof, is a non-constant sequence or a constant sequence; and
      putting out an indication that the feedback shift register is in an integral state if the sequence of values is a non-constant sequence; or
      putting out an indication that the feedback shift register is subjected to an integrity violation if the sequence of values is a constant sequence.

20. The method according to claim 19, the method comprising:
   receiving a sequence of values at an input or output of at least one of the plurality of registers comprised by the feedback shift register, or a logic combination thereof;
   counting the length of runs of 0-Bits and 1-Bits; and
   indicating the detection of integrity violation if the length of a run exceeds a predetermined value.

21. A non-transitory storage medium having stored thereon a computer program having a program code for performing, when running on a computer, a method for detecting an integrity violation exerted on a feedback shift register, the method comprising:
   determining between a preceding and a succeeding register of the plurality of registers as to whether a sequence of values at an input or output of at least one of a plurality of registers comprised by the feedback shift register, or a logic combination thereof, is a non-constant sequence or a constant sequence; and
   putting out an indication that the feedback shift register is in an integral state if the sequence of values is a non-constant sequence; or
   putting out an indication that the feedback shift register is subjected to an integrity violation if the sequence of values is a constant sequence.

22. An embedded system comprising a memory and a controller, wherein the controller is adapted to detect an integrity violation exerted on a feedback shift register implemented in software by a method comprising:
   determining between a preceding and a succeeding register of the plurality of registers as to whether a sequence of values at an input or output of at least one of the plurality of registers comprised by the feedback shift register, or a logic combination thereof, is a non-constant sequence or a constant sequence; and
   putting out an indication that the feedback shift register is in an integral state if the sequence of values is a non-constant sequence; or
   putting out an indication that the feedback shift register is subjected to an integrity violation if the sequence of values is a constant sequence.

23. The embedded system according to claim 22, wherein the embedded system comprises a smartcard controller, an RFID tag or an embedded security controller.

* * * * *